(12) United States Patent
Wu et al.

(10) Patent No.: US 9,237,060 B2
(45) Date of Patent: Jan. 12, 2016

(54) METHOD AND APPARATUS FOR HANDLING PEERS WITH DYNAMIC IP CONNECTIVITY STATUS IN PEER-TO-PEER NETWORKS

(75) Inventors: Wei Wu, Coppell, TX (US); Noun Choi, Flower Mound, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 433 days.

(21) Appl. No.: 12/814,044

(22) Filed: Jun. 11, 2010

(65) Prior Publication Data
US 2011/0307617 A1    Dec. 15, 2011

(51) Int. Cl.
*G06F 15/16*    (2006.01)
*H04L 29/12*    (2006.01)
*H04W 84/18*    (2009.01)

(52) U.S. Cl.
CPC ...... *H04L 29/12952* (2013.01); *H04L 61/6077* (2013.01); *H04W 84/18* (2013.01)

(58) Field of Classification Search
CPC .................. H04L 29/12009; H04L 29/12207; H04L 61/02
USPC ........................................................ 709/228
See application file for complete search history.

(56) References Cited

U.S. PATENT DOCUMENTS

| | | | |
|---|---|---|---|
| 7,263,070 B1 | 8/2007 | Delker et al. | |
| 7,457,882 B2 * | 11/2008 | Stewart et al. | 709/230 |
| 2002/0118656 A1 * | 8/2002 | Agrawal et al. | 370/329 |
| 2004/0064693 A1 | 4/2004 | Pabla et al. | |
| 2007/0244994 A1 | 10/2007 | Bolan et al. | |
| 2008/0112362 A1 * | 5/2008 | Korus | 370/331 |
| 2009/0161601 A1 | 6/2009 | Dai et al. | |
| 2010/0268838 A1 * | 10/2010 | Hong et al. | 709/231 |
| 2012/0036186 A1 * | 2/2012 | Mariblanca Nieves | 709/203 |

OTHER PUBLICATIONS

Ylitalo et al, "Dynamic Network Interface Selection in Multihomed Mobile Hosts", 2002, Proceedings of the 36th Hawaii International conference on System Scienes (HICSS '03), all pages.*
Stewart et al, "Stream Control Transmission Protocol (SCTP) Dynamic Address Reconfiguration", Sep. 2007, Network Working Group, all pages.*
PCT International Search Report; Application No. PCT/US2011/40000; Oct. 26, 2011; 2 pages.
PCT Written Opinion of the International Searching Authority; Application No. PCT/US2011/40000; Oct. 26, 2011; 5 pages.
European Extended Search Report; Application No. 10188835.2; Oct. 12, 2011; 6 pages.

(Continued)

*Primary Examiner* — Hua Fan
(74) *Attorney, Agent, or Firm* — Conley Rose, P.C.; J. Robert Brown, Jr.

(57) ABSTRACT

Method and apparatus for communication in a peer-to-peer (P2P) network are provided. The method comprises a first peer in the P2P network selecting a primary Internet Protocol (IP) address from a plurality of IP addresses associated with the first peer. The method further comprises the first peer providing the primary IP address to a second peer as an address the second peer is to use in initiating communication with the first peer. The apparatus comprises a user equipment (UE) that includes a processor configured such that the UE selects a primary IP address from plurality of IP addresses associated with the UE and registers the primary IP address in the P2P network.

8 Claims, 6 Drawing Sheets

(56) References Cited

OTHER PUBLICATIONS

Baldi, Mario, et al.; "Adding Multi-Homing and Dual-Stack Support to the Session Initiation Protocol;" IEEE Globecom; 2007; 6 pages.

Hautakorpi, J., et al.; "Utilizing HIP (Host Identity Protocol) for P2PSIP (Peer-to-peer Session Initiation Protocol);" draft-hautakorpi-p2psip-with-hip-01.txt; Nov. 19, 2007; 19 pages.

Stewart, R., et al.; "Stream Control Transmission Protocol (SCTP) Dynamic Address Reconfiguration;" RFC 5061; Sep. 2007; 42 pages.

Jennings, C., et al.; "REsource LOcation and Discovery (RELOAD) Base Protocol;" draft-ietf-p2psip-base-08; Mar. 7, 2010; 153 pages.

Rosenberg, J., et al.; Title: "Interactive Connectivity Establishment (ICE): A Protocol for Network Address Translator (NAT) Traversal for Offer/Answer Protocols;" draft-ietf-mmusic-ice-19; Oct. 29, 2007; 120 pgs.

Jennings, C., et al.; Title: "REsource LOcation and Discovery (RELOAD) Base Protocol;" draft-ietf-p2psip-base-00; Oct. 27, 2008; 134 pgs.

Jennings, C., et al.; Title: "A SIP Usage for RELOAD;" draft-ietf-p2psip-sip-03; Oct. 22, 2009; 14 pgs.

http://www.ietf.org/html.charters/p2psip-charter.html; Peer-to-Peer Session Initiation Protocol (p2psip); Sep. 8, 2010; 3 pgs.

Liben-Nowell, D., et al.; Title: "Analysis of the Evolution of Peer-to-Peer Systems;" Proc. 21st Annual Symposium of Principles of Distributed Computing, Monterey, CA, Jul. 21-24, 2002; 10 pgs.

Stoica, I., et al.; "Chord: A Scalable Peer-to-Peer Lookup Protocol for Internet Applications," IEEE/ACM Trans. on Networking, vol. 11, No. 1, Feb. 2003; pp. 17-32.

Canadian Office Action; Application No. 2,802,164; Jul. 21, 2014; 2 pages.

Chinese Office Action; Application No. 201180028823.X; Sep. 29, 2014; 30 pages.

Ylitalo, Jukka, et al.; "Dynamic Network Interface Selection in Multihomed Mobile Hosts"; Proceedings of the 36th Hawaii International Conference on System Sciences; 2003; 5 pages.

Canadian Office Action; Application No. 2,802,164; Aug. 4, 2015; 5 pages.

Chinese Office Action; Application No. 201180028823.X; May 28, 2015; 27 pages.

\* cited by examiner

FIG. 1

| Node Identifier | Primary IP Address | Non-primary IP Addresses | | |
|---|---|---|---|---|
| b | 110.1.1.1 | 110.1.2.1 | 110.1.3.1 | ... |
| c | 110.2.1.1 | 110.2.2.1 | 110.2.3.1 | ... |
| d | 110.3.1.1 | 110.3.2.1 | 110.3.3.1 | ... |
| e | 110.4.1.1 | 110.4.2.1 | 110.4.3.1 | ... |
| f | 110.5.1.1 | 110.5.2.1 | 110.5.3.1 | ... |
| g | 110.6.1.1 | 110.6.2.1 | 110.6.3.1 | ... |

METHOD AND APPARATUS FOR HANDLING PEERS WITH DYNAMIC IP CONNECTIVITY STATUS IN PEER-TO-PEER NETWORKS

BACKGROUND

As used herein, the terms "user equipment" and "UE" might in some cases refer to mobile devices such as mobile telephones, personal digital assistants, handheld or laptop computers, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. An access node may comprise a plurality of hardware and software.

A traditional telecommunications network typically includes a plurality of central components that act as controllers and coordinators for control plane and user plane traffic to and from the clients in the network. A peer-to-peer (P2P) network is a distributed communication system, wherein the nodes act as peers, configured to perform both client and server functions. As used herein, the terms "peer", "node", and "peer node" might be used synonymously. P2P network architectures may be self-organizing, with peers joining and leaving at any time. P2P networks therefore have the ability to link heterogeneous network environments, such as the internet, ad-hoc networks, and home networks, and may realize highly scalable, extensible, and efficiently distributed applications. As there are no centralized network control entities, P2P networks handle functions such as call switching and data routing in a distributed manner, for instance, via defining an overlay network structure and implementing an overlay routing protocol.

P2P networks may be managed or unmanaged. An unmanaged P2P network is fully decentralized, with all peers configured to function as both clients and servers to the other nodes on the network. On the other hand, a managed P2P network may comprise at least one peer acting temporarily as a server, which is managed by the network operators or P2P service providers.

Due to the dynamic structure of P2P networks, each peer is configured to maintain a connection table and to track information on other peers. The connection table may comprise information such as, for instance, node identifier and Internet Protocol (IP) address. If the information on any node in the connection table changes, the other peers may update their respective connection tables.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a P2P network, a peer may be coupled to a plurality of radio interfaces, such as, for instance, a peer in a mobile environment. A peer coupled to at least one radio interface may have a dynamic IP connectivity status, and may have a plurality of IP addresses available for communication. For example, a UE may be associated with an IP address obtained in a cellular network and associated with another IP address obtained in a Wi-Fi network. Another example is a UE connecting to multiple packet data networks (PDNs), where an IP address is obtained for each PDN. The availability of a plurality of IP addresses may offer several advantages such as, for instance, a higher data transmission throughput and/or uninterrupted service in case of a user's mobility, as the UE may dynamically switch radio links. However, in an environment where the availability of radio interfaces may dynamically change, tracking all available IP addresses in the connectivity table may require frequent updates of the table entries. For example, in the case of short range radio interfaces, the IP addresses associated with a UE may often change. Frequent connectivity table updates may not only be inefficient but also power consuming, which may shorten the battery life of the UE.

According to one embodiment, the present disclosure provides a mechanism for handling of nodes with dynamic IP connectivity status, such that the number of connection table updates is reduced when a plurality of available communication channels for data transmission are utilized. Also disclosed herein are systems and methods for handling peers in a P2P network, wherein a peer may have a dynamic IP connectivity status and may be associated with a plurality of IP addresses. A peer may select one of a plurality of IP addresses as the primary IP address and register the primary IP address in the network. That is, the peer might provide its primary IP address to other peers in the P2P network. All other available IP addresses associated with that peer may be considered non-primary IP addresses for that peer.

In an embodiment, a peer in an unmanaged P2P network may choose its primary IP address according to criteria such as, for example, network stability or user preference. In another embodiment, a peer in a managed P2P network may receive network operation policies from a server peer that specify the primary IP address the peer is to use. In yet other embodiments, a combination of these selection criteria might be used. For example, the server peer may impose a plurality of restrictions on the selection of the primary IP address, and the peer may combine its own selection criteria, such as user preference, with the server peer's restrictions.

In an embodiment, the peer may use the primary IP address in the signaling or call setup stage of a call session. In the data transmission stage, the peer may continue to use its primary IP address to transmit data and/or it may use at least one non-primary IP address.

Figure 1:
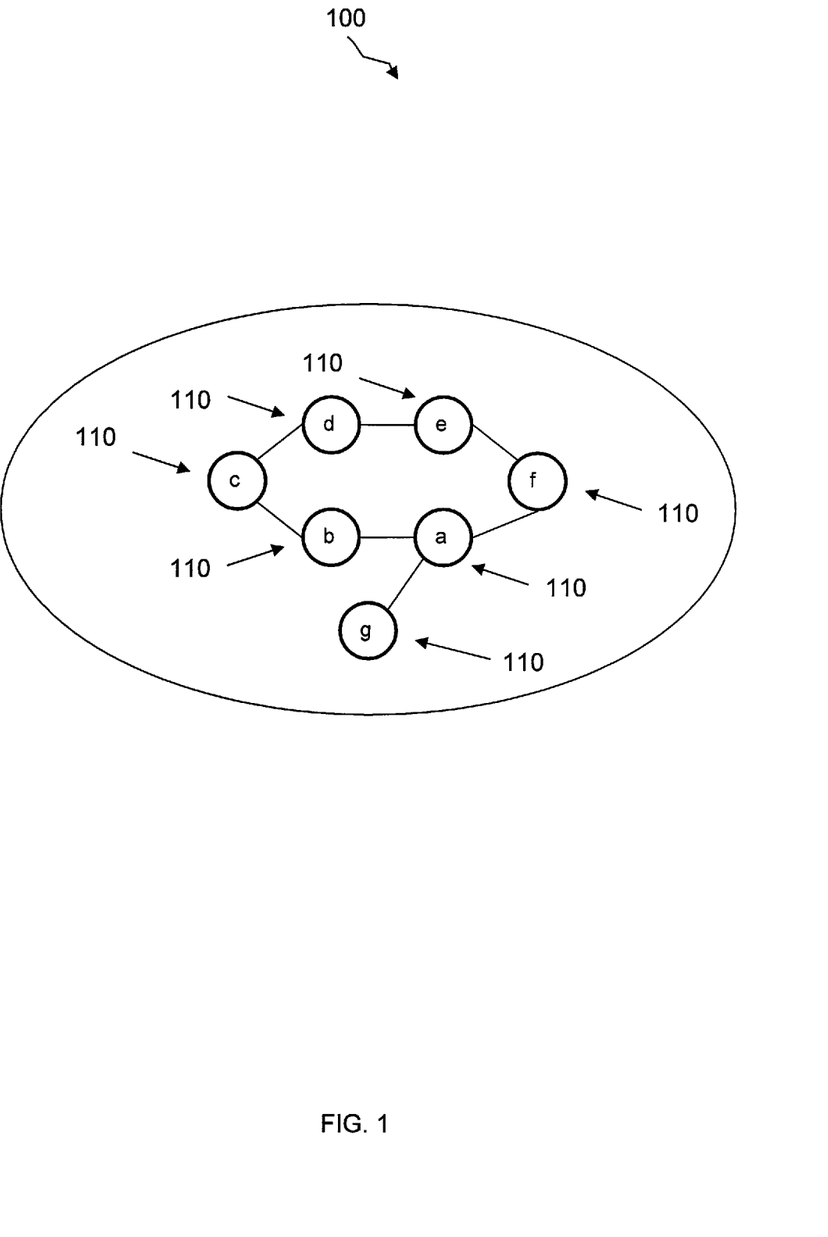
FIG. 1 illustrates an embodiment of a P2P network architecture.

FIG. 1 illustrates an embodiment of a P2P network 100, which may comprise a plurality of P2P nodes 110. Each P2P node 110 may function as the client and/or as the server, and communication between peers may be based on mutual trust. A P2P node 110 may join the network or leave the network at any time. Each P2P node 110, for example node 110a, may maintain a connection table which tracks information on other P2P nodes, for example nodes 110b-g. A P2P node 110 may be configured to send a plurality of messages to any another P2P node 110 either directly or via some intermediary P2P nodes 110 using an overlay routing protocol such as, for instance, the Chord protocol. Routing information may be discovered by broadcasting an inquiry message to a plurality of P2P nodes 110.

In an unmanaged P2P network, all P2P nodes 110 may act as servers and as clients. In a managed P2P network, at least one peer of the P2P nodes 110, for example node 110a, may act as a server peer. The server peer may offer services such as, for instance, monitoring and optimizing network topology, efficient routing information discovery, multicast group management, and security enhancement. The server peer may provide to other peers network information, such as network operation policies for P2P communication between corresponding P2P nodes 110.

Figure 2:
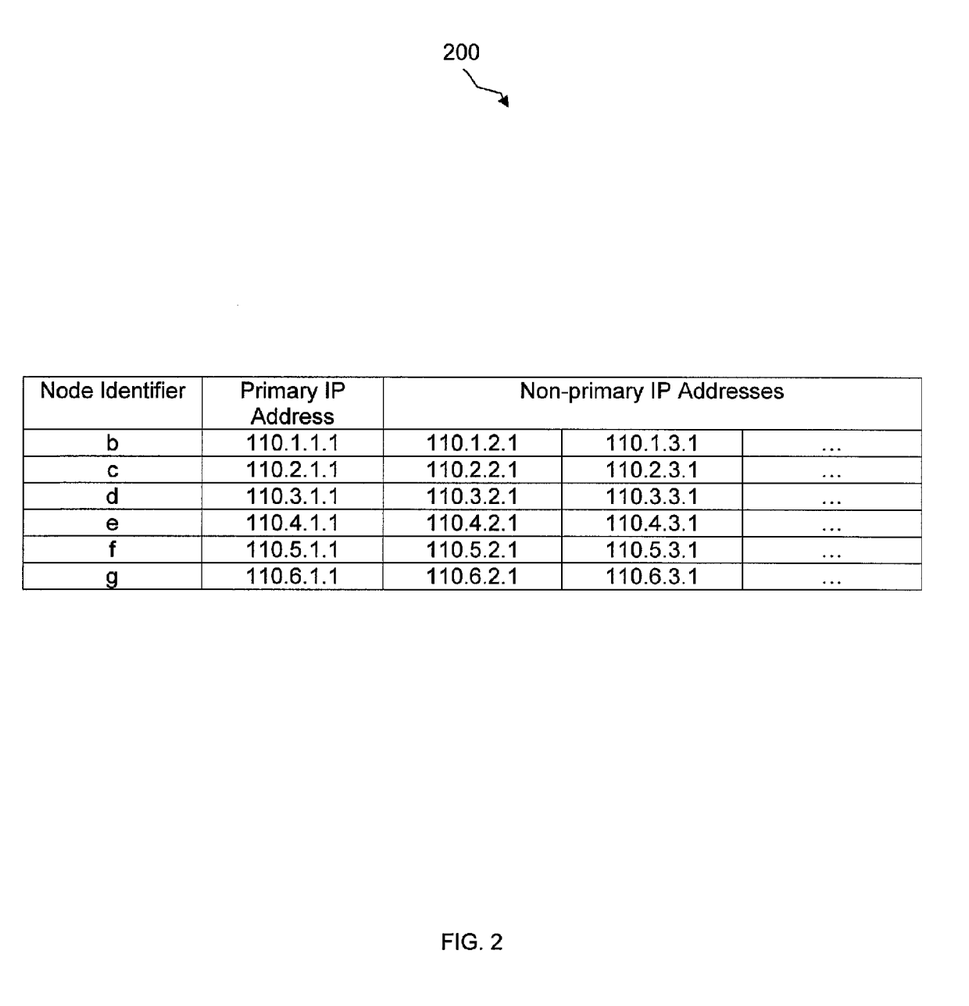
FIG. 2 illustrates an embodiment of a P2P network connection table.

FIG. 2 illustrates an embodiment of a connection table 200 used by, for example, the peer node 110 with node identifier 'a' in the P2P network in FIG. 1. Each entry in the connection table 200 may comprise information on a peer such as a node identifier, the primary IP address associated with the peer, and other available non-primary IP addresses associated with the peer. The node identifier may be a unique identifier assigned by the network, for example via a P2P overlay protocol such as the Chord algorithm. A peer may select its primary IP address, and register said primary IP address in the network. In an embodiment, the peer notifies other peers of changes in its primary IP address but may or may not notify other peers of changes in its non-primary IP addresses. The other peers may update only the primary IP address of that peer in their respective connection tables 200.

Figure 3:
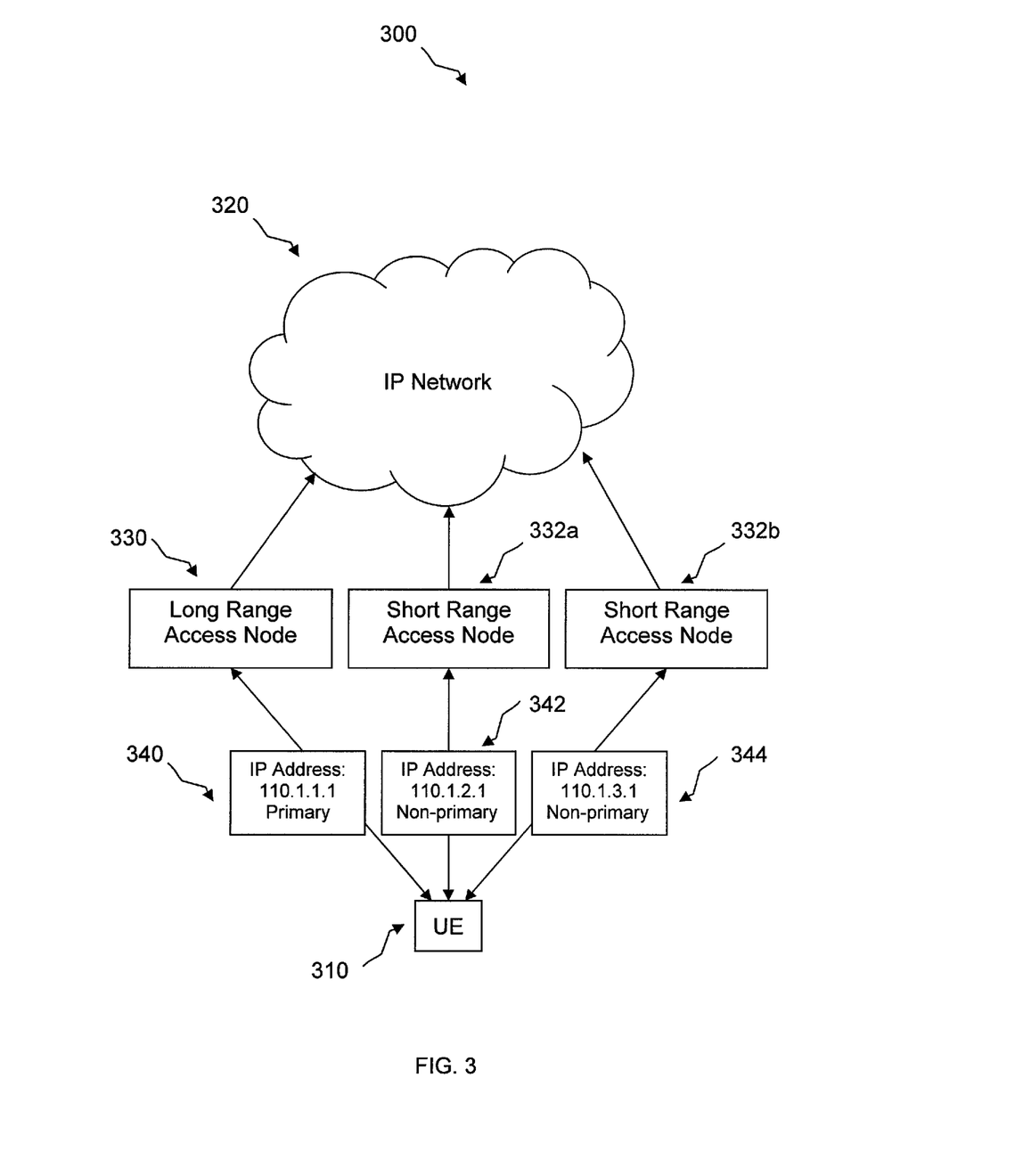
FIG. 3 illustrates an example of a P2P network environment with a plurality of IP network interfaces.

FIG. 3 illustrates an example of a P2P network environment wherein a UE 310 may be coupled to an IP network 320 via plurality of radio interfaces, and the UE 310 may have a plurality of IP addresses simultaneously available for communication. The UE 310 may be equivalent to one of the nodes 110 of FIG. 1. In the example illustrated in FIG. 3, the UE 310 may be coupled to at least one long range radio interface via a long range access node 330. An example of a long range radio interface may be a cellular network. The UE 310 may obtain from the long range radio interface a long range IP address 340. The UE 310 may further be coupled to at least one short range radio interface via a short range access node 332a-b. An example of a short range radio interface may be a wireless fidelity (Wi-Fi) network. The UE 310 may obtain from the short range radio interface a first short range IP address 342.

The availability of IP addresses may change dynamically. For example, as the UE 310 moves around, it may lose the connection with the short range access node 332a, and the first short range IP address 342 may no longer be reachable. If the UE 310 couples to another short range access node 332b, it may acquire a different IP address 344. If peers connected to the UE 310 update their respective connection tables every time a short range IP address changes, the battery lives of the peers may be shortened. On the other hand, the long range IP address 340 obtained from long range access node 330 may be more stable, and updates of that address 340 may occur less frequently.

In an embodiment, a peer in an unmanaged P2P network, coupled to at least one long range radio interface via a long range access node, may select a long range IP address as its primary IP address. In another embodiment, a peer in an unmanaged P2P network may select its primary IP address based on criteria such as address stability or user preference. For example, a peer might select as its primary IP address the IP address obtained in a cellular network because of the wide coverage of the cellular network. On the other hand, a peer may select as its primary IP address the IP address obtained in a Wi-Fi network for cost reasons.

In an embodiment, a peer in a managed P2P network may receive network operation policies from a server peer, and the peer may select the primary IP address in accordance with the network operation policies received from the server peer. The server peer may specify constraints on allowable primary IP addresses. For example, a peer may select its primary address from a list which has been narrowed down by a server peer based on the network operation policies. Alternatively, the network operation policies may specify only one primary IP address for the peer. The peer may register the primary IP address in the network, and the other peers may update only the primary IP address of the peer in their respective connection tables, and may not keep track of the non-primary IP addresses.

In an embodiment, two corresponding peers may notify each other of their respective primary IP addresses in the signaling stage. The corresponding peers may notify each other of further available non-primary IP addresses in the data transmission stage. The corresponding peers may further notify each other of changes in their available non-primary IP addresses in the data transmission stage.

Figure 4:
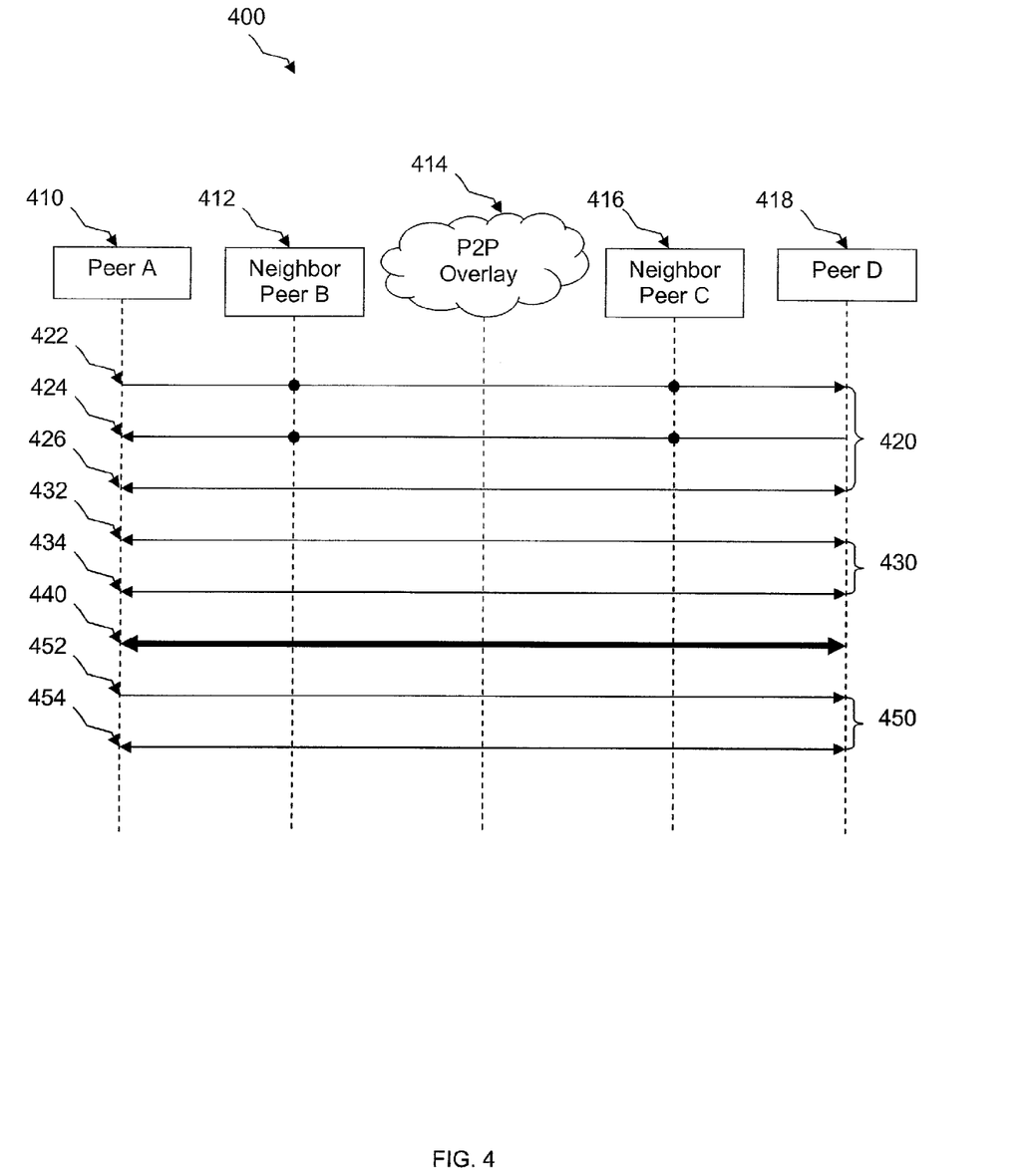
FIG. 4 illustrates an embodiment of a call flow diagram for an unmanaged P2P network.

FIG. 4 illustrates one embodiment of a call flow 400 for an unmanaged P2P network. The flow 400 may comprise a signaling connectivity setup stage 420, a data connectivity setup stage 430, a data transmission stage 440, and an address update stage 450. The flow 400 may begin at step 422, where a peer (Peer A) 410 may send an AppAttach message to a destination peer (Peer D) 418. It is assumed that Peer A 410 has already registered with the network and, therefore, that the other peers in the network are aware of the primary IP address of Peer A 410. The AppAttach message may be routed to Peer D 418 via an overlay routing protocol, via a first neighbor node (Neighbor Peer B) 412, a P2P overlay 414, and a second neighbor node (Neighbor Peer C) 416. The flow 400 may proceed to step 424, wherein Peer D 418 may send to Peer A 410 the primary IP address of Peer D 418. The flow 400 may continue to step 426, wherein Peer A 410 and Peer D 418 may perform a connectivity check for signaling to make sure that they can reach each other directly. Next, at step 432, Peer A 410 may send to Peer D 418 a set comprising at least one IP address that may be used for data transmission. The set may comprise the primary IP address of Peer A 410 and/or at least one other IP address associated with Peer A 410. If a plurality of IP addresses are provided, the priorities of the addresses could be based on the preferences of Peer A 410. The messages can be carried by any application layer application protocol.

Similarly, Peer D 418 may send to Peer A 410 a set comprising at least one IP address that may be used for data transmission. The set may comprise the primary IP address of Peer D 418 and/or at least one other IP address associated with Peer D 418. The flow 400 may then proceed to step 434, wherein Peer A 410 and Peer D 418 may perform a connectivity check for data transmission to make sure that they can reach each other directly using the available IP address pairs. At the data transmission stage 440, Peer A 410 and Peer D 418 may exchange user data. The flow 400 may continue to step 452, wherein Peer A 410 may optionally provide to Peer D 418 at least one updated IP address. Next, at step 454, Peer A 410 and Peer D 418 optionally perform a connectivity check for data transmission.

As an example of the call flow 400, Peer A 410 may be coupled to a cellular network and to a Wi-Fi interface, while Peer D 418 may be coupled to a fixed network. At step 432, where a set comprising at least one IP address for data transmission is exchanged, Peer A 410 may send to Peer D 418 its primary IP address obtained from the cellular network, such as the long range address 340 illustrated in FIG. 3. Peer A 410 may also send to Peer D 418 a non-primary IP address obtained from the Wi-Fi network, such as the short range address 342 illustrated in FIG. 3. Peer D 418 may send to Peer A 410 its primary IP address obtained from the fixed network, such as the long range address 340 illustrated in FIG. 3. When data transfer begins between Peer A 410 and Peer D 418, any combination of these addresses might be used.

Figure 5:
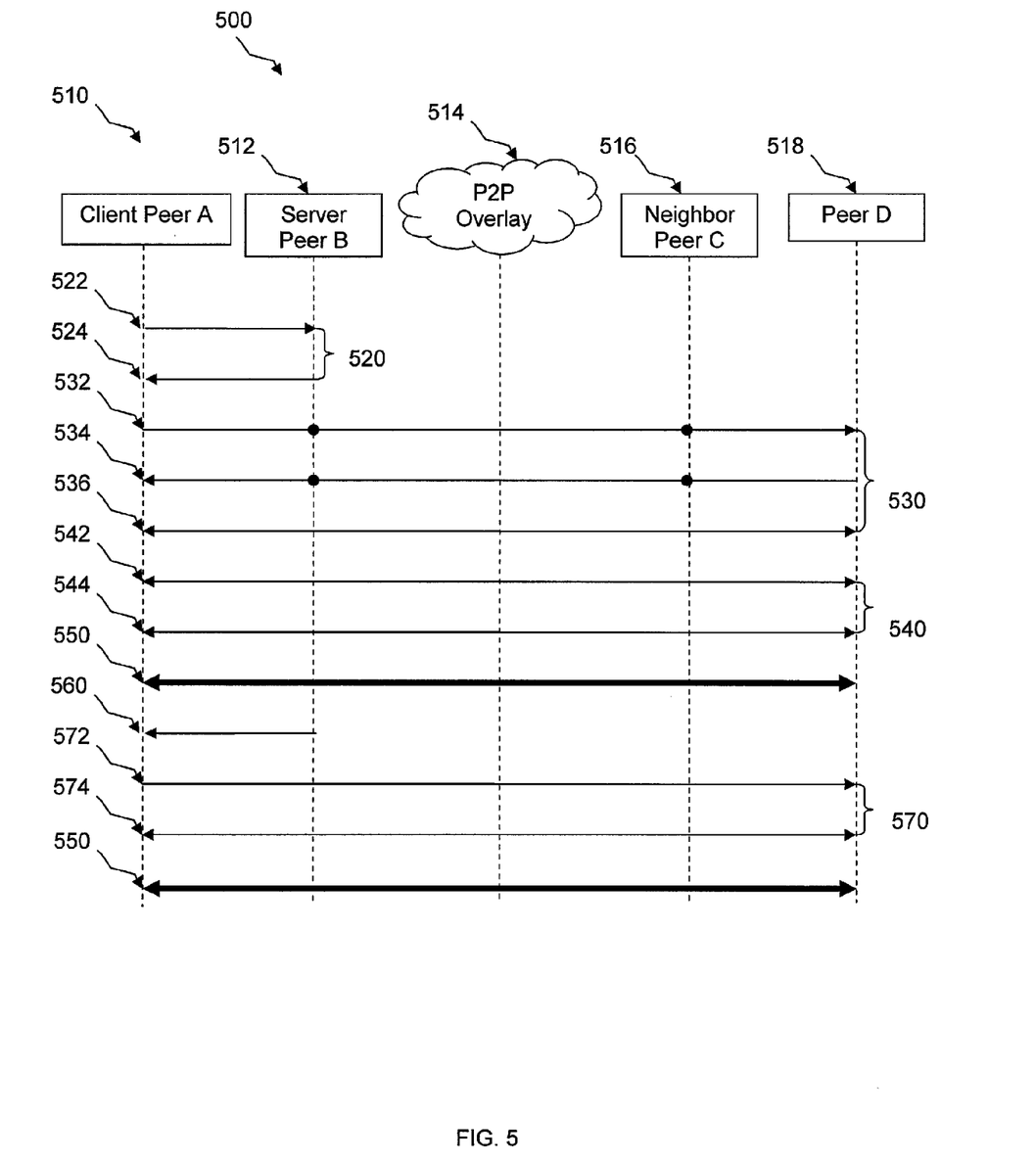
FIG. 5 illustrates an embodiment of a call flow diagram for a managed P2P network.

FIG. 5 illustrates one embodiment of a call flow 500 for a managed P2P network. The flow 500 may comprise a server peer communication stage 520, a signaling connectivity setup stage 530, a data connectivity setup stage 540, a data transmission stage 550, a update request stage 560, and an address update stage 570. The flow 500 may begin at step 522, wherein a peer (Client Peer A) 510 may send a join request message to the server peer (Peer B) 512. It is again assumed that Peer A 510 has already registered with the network and, therefore, that the other peers in the network are aware of the primary IP address of Peer A 510. Peer B 512 may send a join answer message 524 to Peer A 510. The message 524 may include IP connection policies together with other information for Peer B's joining procedure. Alternatively, the IP connection policies may also be preconfigured locally at Peer A 510. In such a case, there is no need for Peer B 512 to provide such policies. The flow 500 may then proceed to step 532, wherein Peer A 510 may send an AppAttach message to destination Peer D 518. The AppAttach message may be routed to Peer D 518 via an overlay routing protocol, via Peer B 512, a P2P overlay 514, and a neighbor node (Neighbor Peer C) 516. The flow 500 may proceed to step 534, wherein Peer D 518 may send to Peer A 510 the primary IP address of Peer D 518. The flow 500 may continue to step 536, wherein Peer A 510 and Peer D 518 may perform a connectivity check for signaling to make sure that they can reach each other directly. Next, at step 542, Peer A 510 may send to Peer D 518 a set comprising at least one IP address that may be used for data transmission. The set may comprise the primary IP address of Peer D 510 and/or at least one other IP address associated with Peer A 510. If a plurality of IP addresses are provided, the addresses could be provided based on the received IP connection policies as well as Peer A's choice. The messages can be carried by any upper layer application protocol.

Similarly, Peer D 518 may send to Peer A 510 a set comprising at least one IP address that may be used for data transmission. The set may comprise the primary IP address of Peer D 418 and/or at least one other IP address associated with Peer D 518. Next, the flow 500 proceeds to step 544, wherein Peer A 510 and Peer D 518 may perform a connectivity check for data transmission to make sure that they can reach each other directly using the available IP address pairs. At the data transmission stage 550, Peer A 510 and Peer D 518 may exchange user data. The flow 500 may continue to step 560, wherein Peer B 512 may optionally send an update request to Peer A 510 to update the IP connection policies. The flow 500 may continue to step 572, wherein Peer A 510 may optionally update the IP address due to policy change while the session is active. Next, at step 574, Peer A 510 and Peer D 518 may optionally perform a connectivity check for any new IP address.

As an example of the call flow 500, Peer A 510 may be coupled to a cellular network and to a Wi-Fi interface, while Peer D 518 may be coupled to a fixed network. At step 524, Peer B 512 may send to Peer A 510 a plurality of restrictions on allowable IP addresses. Peer A 510 select from its available IP addresses those which comply with the set of restrictions obtained from Peer B 512, and then use only those selected IP addresses for data transmission. At step 536, where a set comprising at least one IP addresses for data transmission is exchanged, Peer A 510 may send to Peer D 518 a primary IP address obtained from the cellular network, such as the long range address 340 illustrated in FIG. 3. Peer A 510 may further send to Peer D 518 a non-primary IP address obtained from the Wi-Fi network, such as the short range address 342 illustrated in FIG. 3. Peer D 518 may send to Peer A 510 its primary IP address obtained from the fixed network, such as the long range address 340 illustrated in FIG. 3.

Figure 6:
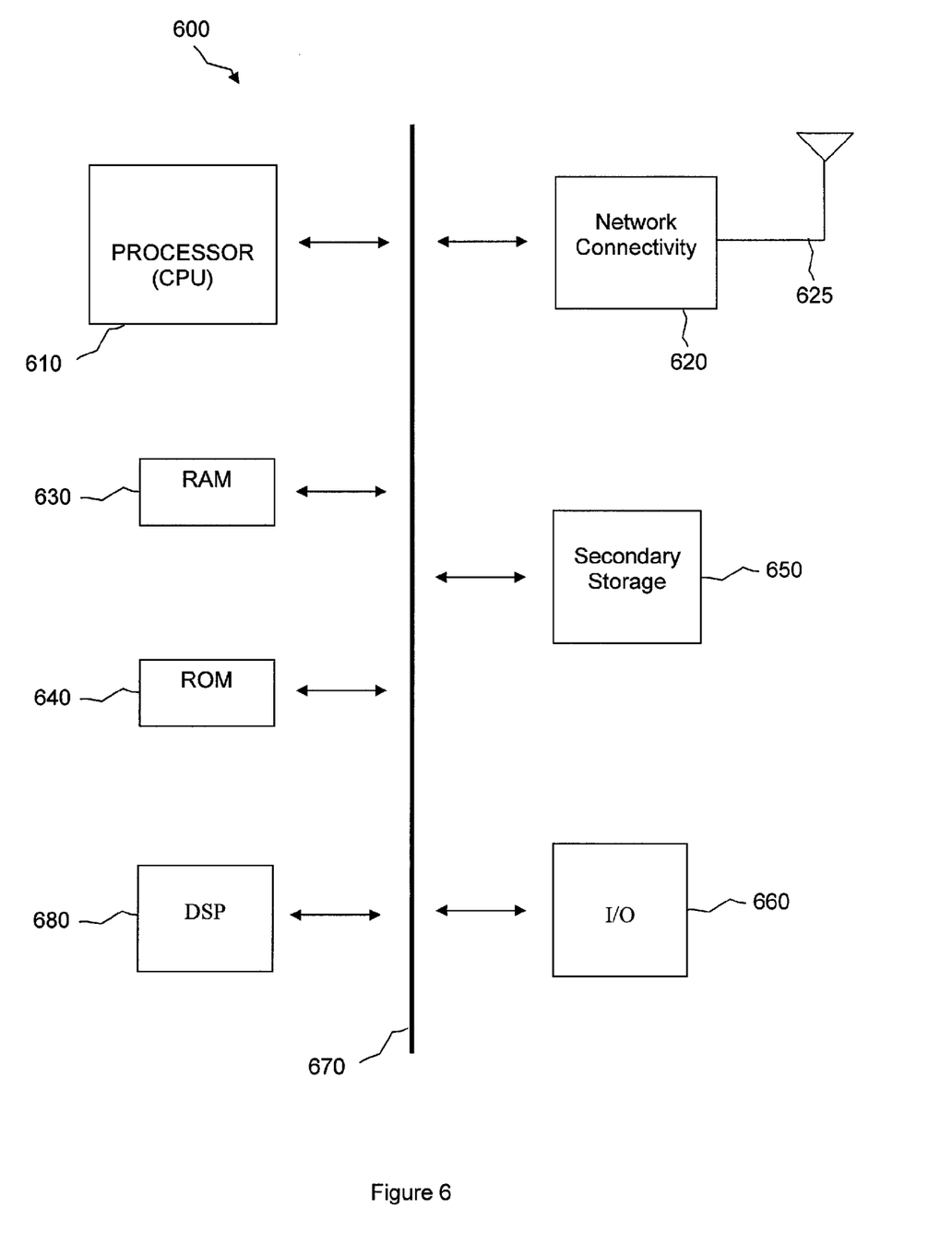
FIG. 6 illustrates a processor and related components suitable for implementing the several embodiments of the present disclosure.

The access node, UE, and other components described above might include a processing component that is capable of executing instructions related to the actions described above. FIG. 6 illustrates an example of a system 600 that includes a processing component 610 suitable for implementing one or more embodiments disclosed herein. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

In an embodiment, a method for communication in a P2P network is provided. The method comprises a first peer in the P2P network selecting a primary IP address from a plurality of IP addresses associated with the first peer. The method further comprises the first peer providing the primary IP address to a second peer as an address the second peer is to use in initiating communication with the first peer.

In another embodiment, a UE in a P2P network system is provided. The UE comprises a processor configured such that the UE selects a primary IP address from plurality of IP addresses associated with the UE and registers the primary IP address in the P2P network.

In another embodiment, a UE in a P2P network system is provided. The UE comprises a processor configured such that the UE receives a primary IP address from a peer in the P2P network, stores the primary IP address in a connection table associated with the peer, and uses the primary IP address in communicating with the peer.

In another embodiment, a node in a managed P2P network is provided. The node comprises a processor configured such that the node receives at least one network operation policy from a server peer in the P2P network, and configured such that the node uses the at least one policy in selecting a primary IP address to be used by at least one peer in the P2P network in communicating with the node.

In another embodiment, a node in a managed P2P network is provided. The node comprises a processor configured such that the node sends at least one network operation policy to a peer in the P2P network, the at least one policy usable by the peer in selecting a primary IP address to be used by at least one other node in the P2P network in communicating with the peer.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a peer-to-peer (P2P) network, comprising:
   a first peer in the P2P network receiving at least one network operation policy from a server peep in the P2P network in response to sending a join request to the server peer;
   the first peer perusing the at least one network operation policy to select a primary Internet Protocol (IP) address from a plurality of IP addresses that identify the first peep, wherein the selected primary IP address complies with the at least one network operation policy;
   the first peer providing the primary IP address to a second peer as an address the second peer is to use in initiating communication with the first peer, wherein the first peer provides the primary IP address to the second peer in a signaling stage;
   the first peer providing to the second peer at least one additional IP address from the plurality of IP addresses as an address available to the second peer for use in communicating with the first peer, wherein the first peer provides the at least one additional IP address to the second peer in a data transmission stage;

the first peer establishing session with the second peer;

the first peer receiving an update request to update the network operation policy from the server peer;

the first peer updating the primary IP address based on the updated network operation policy while the session with the second peer is active; and the first peer performing a connectivity check with the second peer using the updated primary IP address.

2. The method of claim 1, wherein, when the P2P network is a managed network.

3. The method of claim 1, wherein the first peer provides an update of the at least one additional IP address to the second peer in a data transmission stage.

4. A device configured to:

operate in a peer-to-peer (P2P network);

receive at least one network operation policy from a server peer in the P2P network;

use the at least one network operation policy to select a primary Internet Protocol (IP) address from a plurality of IP addresses that identify the device, the selected primary IP address compliant with the at least one network operation policy;

register the primary IP address in the P2P network;

establish a session with a second peer in the P2P network, wherein the device provides the primary IP address to the second peer in a signaling stage;

provide to the second peer at least one additional IP address from the plurality of IP addresses as an address available to the second peer for use in communicating with the device, wherein the device provides the at least one additional IP address to the second peer in a data transmission stage;

receive an update request to update the network operation policy from the server peer;

update the primary IP address in the P2P network based on the updated network operation policy while the session with second peer is active; and perform a connectivity check with the second peer using the updated primary IP address.

5. The device of claim 4, wherein, when the P2P network is a managed network.

6. The device of claim 4, wherein the device is further configured to provide an update of the at least one additional IP address to the second peer in a data transmission stage.

7. A node configured to:

operate in a managed peer-to-peer (P2P) network;

receive at least one network operation policy from a server peer in a the P2P network;

use the at least one policy to select a primary Internet Protocol (IP) address from a plurality of IP addresses identifying the node to be used by at least one peer in the P2P network in communicating with the node, the primary IP address compliant with the at least one policy;

provide the primary address to a second node as an address the second node is to use in initiating communication with the node, wherein the node provides the primary IP address to the second node in a signaling stage;

provide at least one additional IP address to the second node in a data transmission stage;

establish a session with the second node;

receive a request from the server peer to update the network operation policy;

update the primary IP address based on the update network operation policy while the session with the second node is active; and perform a connectivity check with the second node using the updated primary IP address.

8. The node of claim 7, wherein the node is further configured to provide an update of the additional IP address to the second node in the data transmission stage.

* * * * *